United States Patent
Mayer et al.

(10) Patent No.: US 11,524,247 B2
(45) Date of Patent: Dec. 13, 2022

(54) TOY FIGURINE

(71) Applicant: Mattel, Inc., El Segundo, CA (US)

(72) Inventors: Louis-Philippe Mayer, Los Angeles, CA (US); Ronald M. Asbach, Grand Island, NY (US); Andrew Sik lun Wong, Torrance, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 17/187,950

(22) Filed: Mar. 1, 2021

(65) Prior Publication Data

US 2022/0274032 A1    Sep. 1, 2022

(51) Int. Cl.
| | |
|---|---|
| *A63H 3/00* | (2006.01) |
| *A63H 9/00* | (2006.01) |
| *A63H 3/46* | (2006.01) |
| *B29C 65/60* | (2006.01) |
| *B29C 65/56* | (2006.01) |
| *B29L 31/52* | (2006.01) |
| *B29K 623/00* | (2006.01) |

(52) U.S. Cl.
CPC ............ *A63H 9/00* (2013.01); *A63H 3/00* (2013.01); *A63H 3/46* (2013.01); *B29C 65/565* (2013.01); *B29C 65/606* (2013.01); *B29K 2623/065* (2013.01); *B29L 2031/5218* (2013.01)

(58) Field of Classification Search
CPC ... A63H 3/00; A63H 3/36; A63H 9/00; B29C 65/00; B29C 65/02; B29C 65/06; B29C 65/40
See application file for complete search history.

(56) References Cited

U.S. PATENT DOCUMENTS

| | | | |
|---|---|---|---|
| 1,509,604 A | 9/1924 | Myers | |
| 1,690,778 A | 11/1928 | Ford | |
| 3,059,377 A | 10/1962 | Brown | |
| 3,579,902 A | 5/1971 | Osborne | |
| 3,783,554 A | 1/1974 | Shapero | |
| 3,816,957 A | 6/1974 | Nakajima | |
| 4,205,785 A | 6/1980 | Stanley | |
| 4,334,385 A | 6/1982 | Melin | |
| 4,571,209 A * | 2/1986 | Manning | A63H 3/46 446/376 |
| 4,595,378 A | 6/1986 | Sweet | |
| 4,657,519 A * | 4/1987 | Kobayashi | A63H 3/46 446/376 |
| 4,714,446 A * | 12/1987 | Lee | A63H 3/36 446/361 |

(Continued)

*Primary Examiner* — John A Ricci
(74) *Attorney, Agent, or Firm* — Edell, Shapiro & Finnan, LLC

(57) ABSTRACT

A body assembly for a toy figurine comprising an inner plate having a plurality of openings, a first outer section coupled to a first side of the inner plate, and a second outer section coupled to a second side of the inner plate. The first outer section includes one or more first coupling members positioned on one side of the first outer section that are engaged with one or more of the openings on the inner plate. The second outer section includes one or more second coupling members positioned on one side of the second outer section that are engaged with one or more of the openings on the inner plate. The inner plate is thus enclosed between the first outer section and the second outer section. The inner plate further holds the first outer section and the second outer section together.

19 Claims, 9 Drawing Sheets

(56) References Cited

U.S. PATENT DOCUMENTS

| | | | |
|---|---|---|---|
| 4,775,352 A | | 10/1988 | Curran |
| 4,919,987 A | * | 4/1990 | Manner ............... B29C 65/0672 |
| | | | 428/474.7 |
| 4,997,500 A | * | 3/1991 | Arnett ................... B29C 66/126 |
| | | | 156/92 |
| 5,480,341 A | | 1/1996 | Plakos |
| 5,547,413 A | | 8/1996 | Murray |
| 6,537,131 B1 | | 3/2003 | Larian |
| 6,568,986 B2 | | 5/2003 | Kobayashi |
| 6,582,272 B1 | | 6/2003 | Nelson |
| 6,641,895 B1 | | 11/2003 | Adams |
| 6,790,117 B2 | | 9/2004 | Ruiz Gonzalez |
| 7,913,968 B2 | | 3/2011 | Sullivan |
| 8,308,524 B2 | | 11/2012 | deFelice |
| 8,333,634 B2 | | 12/2012 | Norman |
| 9,174,138 B2 | | 11/2015 | Norman |
| 9,636,600 B2 | | 5/2017 | Rudisill |
| 2001/0046828 A1 | | 11/2001 | Morris |
| 2004/0253901 A1 | | 12/2004 | Donahue |
| 2006/0234599 A1 | | 10/2006 | Mo |
| 2007/0264901 A1 | | 11/2007 | Sisamos |
| 2007/0264902 A1 | | 11/2007 | Ellman |
| 2009/0318053 A1 | | 12/2009 | Tager |
| 2010/0041300 A1 | | 2/2010 | Bevirt |
| 2010/0041301 A1 | | 2/2010 | Phillips |
| 2010/0210171 A1 | | 8/2010 | Chan |
| 2010/0210173 A1 | | 8/2010 | Maggiore |
| 2010/0216367 A1 | | 8/2010 | Kasahara |
| 2011/0114031 A1 | | 5/2011 | Mann |
| 2012/0329361 A1 | | 12/2012 | Buckley |
| 2014/0094084 A1 | | 4/2014 | Lambrakis |

* cited by examiner

TOY FIGURINE

FIELD OF THE INVENTION

The present invention relates generally to toy assemblies, and in particular, body assemblies for toy figurines and dolls.

BACKGROUND OF THE INVENTION

The fabrication of toy figurines and dolls has evolved over time, reflecting shifting trends and consumer preferences, improvements in manufacturing processes, as well as changes in the materials available and used. Toy figurines are commonly assembled with different parts and sections screwed together. For toy figurines manufactured from a plastic material such as acrylonitrile butadiene styrene (ABS), fabrication of the toy figurine often involves solvent bonding/gluing two plastic halves together to form the body or torso of the toy figurine. The use of adhesives or glue to connect the two plastic halves provides the benefit of eliminating exterior assembly details associated with other conventional joining methods (e.g., screw holes).

However, the presence of metal screws and/or adhesives can affect the overall recyclability of the toy figurine. Furthermore, when the plastic material is switched from acrylonitrile butadiene styrene (ABS) to a different material, difficulty or an inability to solvent bond/glue the components together may become an issue. For example, high-density polyethylene (HDPE) is inert to chemicals for solvent bonding and is also too soft to respond to the ultrasonic frequency for ultrasonic welding (the softness of the material absorbs the vibrational energy needed to generate the localized friction heat for melting the material).

Thus, there is a need for a novel toy figurine and related method of fabricating such a toy figurine that does not rely on solvent bonding/gluing the components together, but still provides a body or torso with no visible exterior assembly details.

SUMMARY OF THE INVENTION

A toy figurine is described herein where the body assembly includes two outer sections that are individually coupled to an inner plate. The outer sections are held together by the inner plate, which eliminates the need for screws or adhesives and allows the body assembly to be fabricated from a wide range of polyolefin materials, such as high-density polyethylene (HDPE). Thus, the entire toy figurine can be fabricated using a single material, such as a recyclable plastic, to create an easily recyclable and environmentally conscious toy.

In one or more embodiments, the body assembly of the toy figurine comprises an inner plate having a plurality of openings, a first outer section coupled to a first side of the inner plate, and a second outer section coupled to a second side of the inner plate. The first outer section includes one or more first coupling members positioned on one side of the first outer section that are engaged with one or more of the openings on the inner plate. The second outer section includes one or more second coupling members positioned on one side of the second outer section that are engaged with one or more of the openings on the inner plate. The inner plate is thus enclosed between the first outer section and the second outer section. Furthermore, the inner plate holds the first outer section and the second outer section together. In certain instances, the first outer section is not directly coupled to the second outer section.

In certain embodiments, the one or more first coupling members are different from the one or more second coupling members. In one instance, the one or more first coupling members are studs and the first outer section is thermoplastic staked or heat staked to the inner plate. The one or more second coupling members are snap-fit connectors interlocked with the inner plate. In some embodiments, the inner plate includes one or more sockets and/or ball joints for engaging with one or more appendages of the toy figurine. In one instance, the body assembly further comprises a pair of arms and the inner plate includes a pair of recessed areas. Each arm is movably retained between one of the recessed areas and the first outer section. In another instance, the body assembly further comprises a pair of legs and the inner plate includes a pair of annular (e.g., donut-shaped) ball joints. Each leg is movably coupled to one of the annular (e.g., donut-shaped) ball joints. In certain embodiments, the body assembly is completely made of a high-density polyethylene (HDPE) and does not include an adhesive or screw.

In one or more other embodiments, a toy assembly is provided. The toy assembly comprises an inner plate, a front section coupled to the inner plate, and a back section also coupled to the inner plate. The front section and the back section form an outer shell that encloses the inner plate and the inner plate holds the front section and the back section together. In certain embodiments, the front section is not directly coupled to the back section.

The front section includes one or more first coupling members that are engaged with the inner plate and the back section includes one or more second coupling members that are engaged with the inner plate. In a preferred embodiment, the one or more first coupling members are different from the one or more second coupling members. In one instance, the one or more first coupling members are studs and the front section is thermoplastic staked or heat staked to the inner plate. The one or more second coupling members are snap-fit connectors interlocked with the inner plate. In further embodiments, the inner plate includes one or more sockets and/or ball joints for engaging with one or more external members.

In one or more other embodiments, a method of fabricating a body assembly for a toy figurine is provided. The method comprises the steps of providing an inner plate having a plurality of holes and openings, a first outer section with molded studs, and a second outer section with snap-fit connectors. The first outer section is positioned to be proximate a first side of the inner plate and the molded studs are inserted through the holes of the inner plate. The first outer section is then thermoplastic staked or heat staked to the inner plate. The second outer section is positioned to be proximate a second side of the inner plate and the snap-fit connectors are aligned with the openings of the inner plate. The second outer section is then pressed against the inner plate such that the snap-fit connectors interlock with the openings of the inner plate. The inner plate is thereby enclosed between the first outer section and the second outer section. Furthermore, the inner plate holds the first outer section and the second outer section together.

In some embodiments, the method further comprises the step of retaining a portion of a pair of arms between the first outer section and the inner plate before thermoplastic staking or heat staking the first outer section to the inner plate. Additionally or alternatively, the method may further comprise the step of coupling a pair of legs to the inner plate before pressing the second outer section against the inner plate.

Other objects, features, and advantages of the present invention will become apparent to those skilled in the art from the following detailed description. It is to be understood, however, that the detailed description and specific examples, while indicating some embodiments of the invention, are given by way of illustration and not limitation. Many changes and modifications within the scope of the invention may be made without departing from the spirit thereof, and the present invention includes all such modifications.

BRIEF DESCRIPTION OF THE DRAWINGS

Referring now to the drawings in which like reference numbers represent corresponding parts throughout:

FIG. 1A shows a front view of the body assembly, FIG. 1B shows a back view of the body assembly, and FIG. 1C shows a front view of the body assembly with the front body section removed;

FIG. 2A shows a front perspective view of the inner plate. FIG. 2B shows a back perspective view of the inner plate;

FIG. 3A shows a perspective view of the inner side of the front body section. FIG. 3B shows a perspective view of the front body section coupled to the inner plate of FIGS. 2A-2B;

FIG. 4A shows a perspective view of the inner side of the back body section. FIG. 4B shows a perspective view of the back body section coupled to the inner plate of FIGS. 2A-2B;

FIG. 5A shows a front perspective view of the torso. FIG. 5B shows a cross-sectional view of the torso of FIG. 5A along line A-A.

DETAILED DESCRIPTION OF THE INVENTION

Figure 1C:
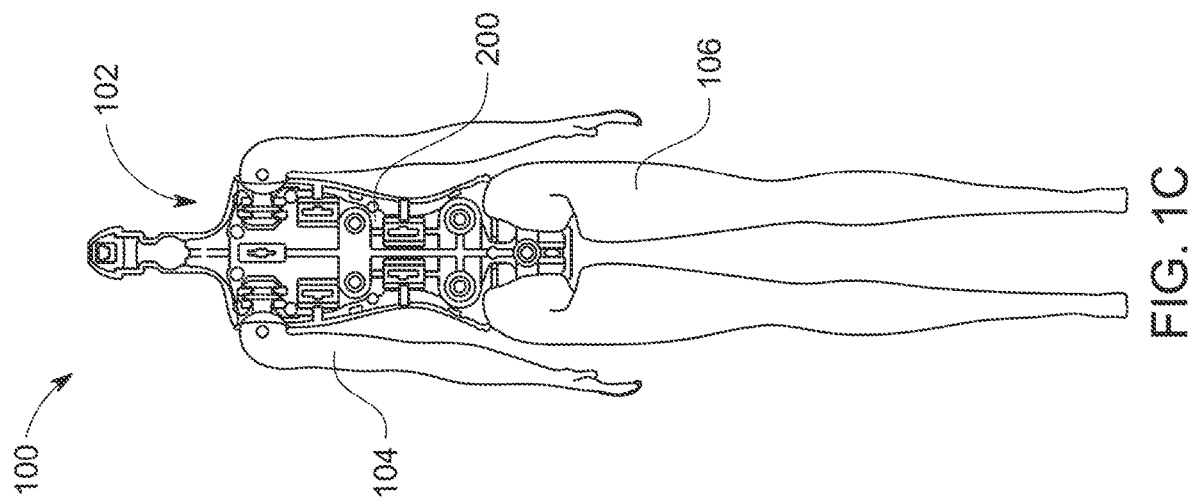
FIGS. 1A-1C illustrate various views of a body assembly of a toy figurine, in accordance with an embodiment of the invention.
Figure 1B:
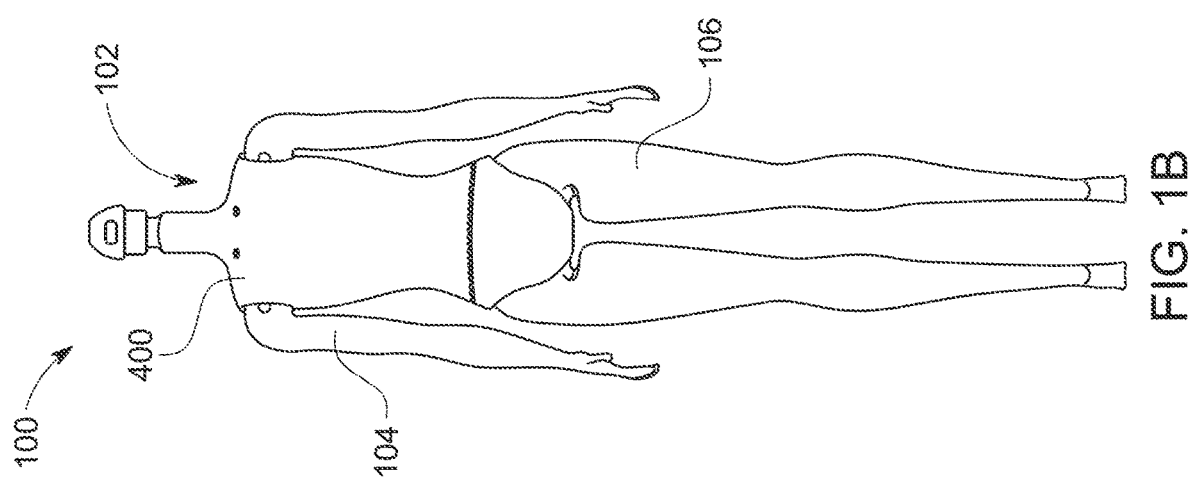
Figure 1A:
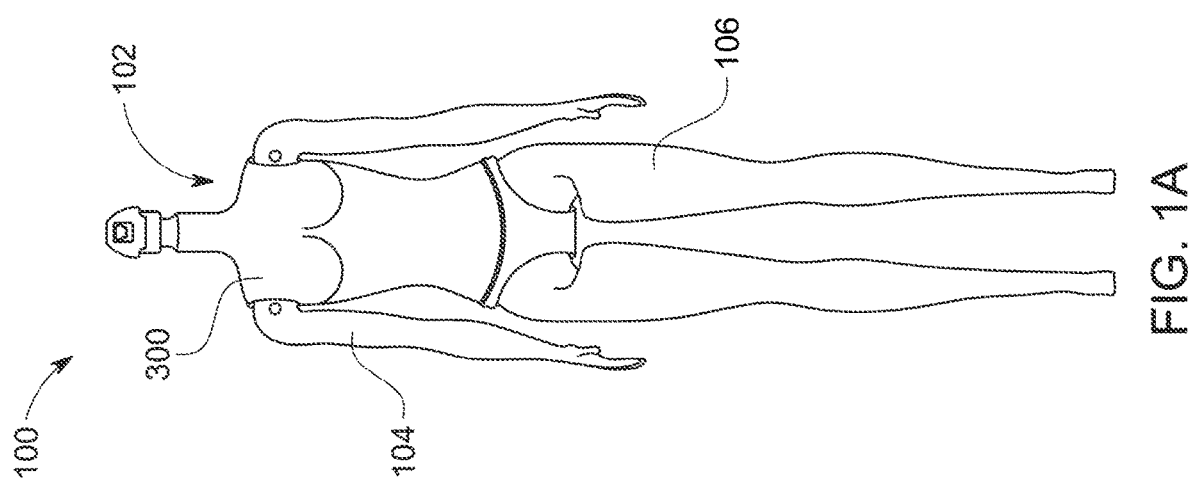

A toy figurine and a related method of fabricating a toy figurine are disclosed. FIGS. 1-5 set forth an illustrative example of a body assembly 100 for a toy figurine. As shown in FIGS. 1A-1C, body assembly 100 includes a torso 102 with arms 104 and legs 106 moveably connected to torso 102. A head (not shown) is connected to body assembly 100 to complete the toy figurine. Torso 102 comprises an outer torso shell formed from two sectional halves, a front body section 300 and a back body section 400. Enclosed within front body section 300 and back body section 400 is an inner plate 200 (see, e.g., FIG. 1C). Due to the method used to construct body assembly 100, which will be discussed in further detail herein, exterior assembly details such as screw holes are notably absent from the front and back of torso 102 for a clean and pleasing aesthetic. Body assembly 100 may be made of any plastic material, including materials and resins that are difficult to solvent bond/glue together, such as high-density polyethylene (HDPE) and polypropylene copolymer (PPCO). In one preferred embodiment, body assembly 100 is fabricated from a post-consumer recycled high-density polyethylene (HDPE) or a bio/plant-based plastic.

Figure 2A:
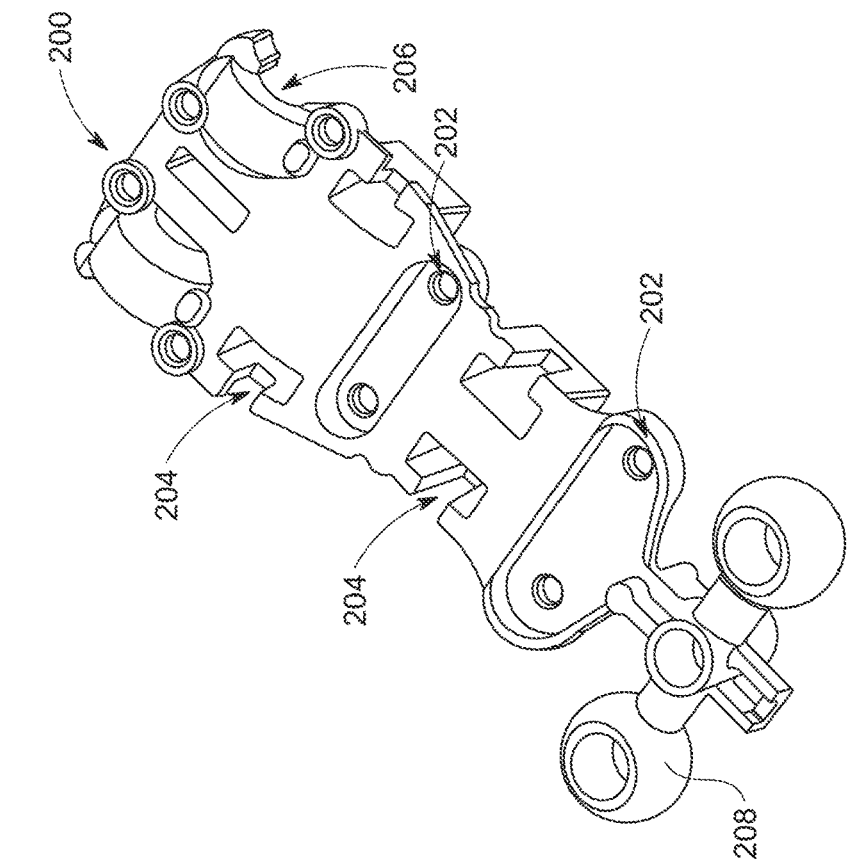
FIGS. 2A and 2B illustrate various perspective views of the inner plate of the body assembly of FIGS. 1A-1C, in accordance with an embodiment of the invention.
Figure 2B:
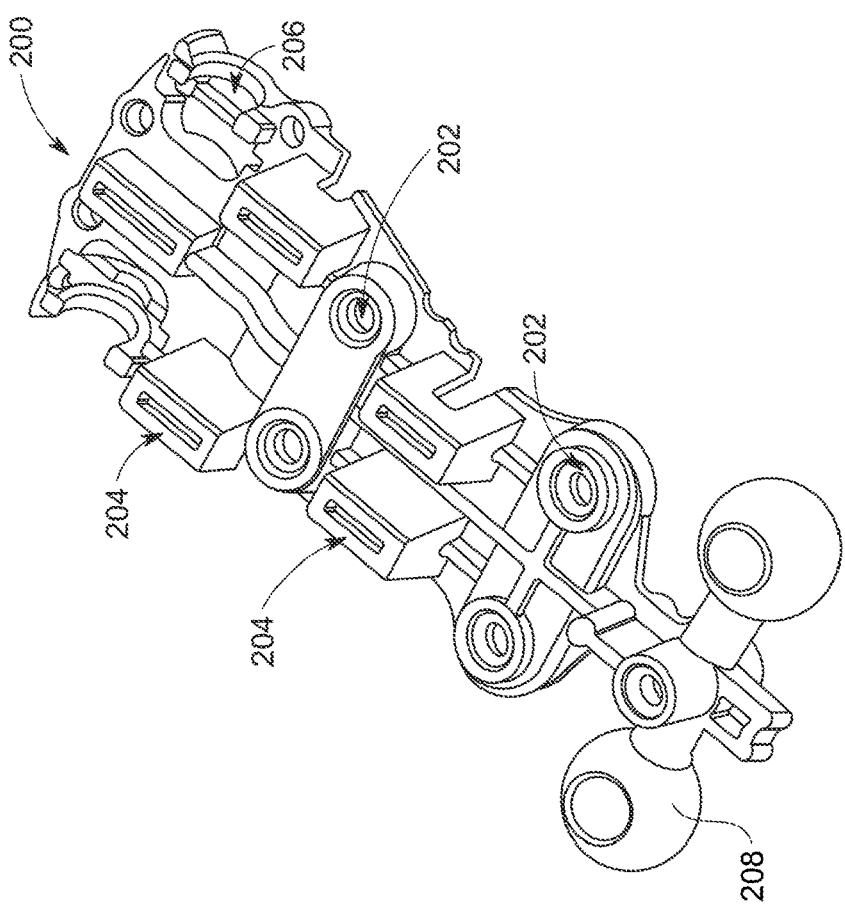

Referring now to FIGS. 2A and 2B, inner plate 200 has multiple holes 202 and openings 204. In the exemplary embodiment illustrated, holes 202 and openings 204 are differently sized and shaped. In other embodiments, the holes and openings of the inner plate are the same size and/or shape. Inner plate 200 also includes a pair of recesses 206 that allow arms 104 to be movably connected to torso 102. The recesses 206 are disposed adjacent, or at least, proximate to, a top of the inner plate 200 (i.e., an edge that will be disposed closest to a head of the figurine). In other embodiments, the inner plate includes a pair of sockets for connecting the arms.

Inner plate 200 further includes a pair of ball joints 208 that allow legs 106 to be movably connected to torso 102. Conventionally, hip connector ball joints are "C" shaped with a cutout that allows the ball joint to deform and snap-fit into a leg socket. However, some materials such as HDPE have low elasticity (i.e., relaxes and deforms under stress/pressure and fails to return to its original shape), which affects its ability to form a tight snap-fit connection. Thus, ball joints 208 are instead annular (e.g., "donut" shaped with a cylindrical center cutout), which addresses the low elasticity of materials such as HDPE and provides a tight snap-fit connection with legs 106. The ball joints 208 are disposed adjacent, or at least, proximate to, a bottom of the inner plate 200 (i.e., an edge that will be disposed closest to legs of the figurine).

In a preferred embodiment, inner plate 200 is the same plastic material as front body section 300 and back body section 400 (e.g., HDPE, PPCO). In other embodiments, the inner plate is a different material from the front body section and the back body section, for example a different plastic material, a metal that provides additional structural strength to the toy figurine, or a printed circuit board (PCB) that also provides various electronic features to the toy figurine.

Figure 3A:
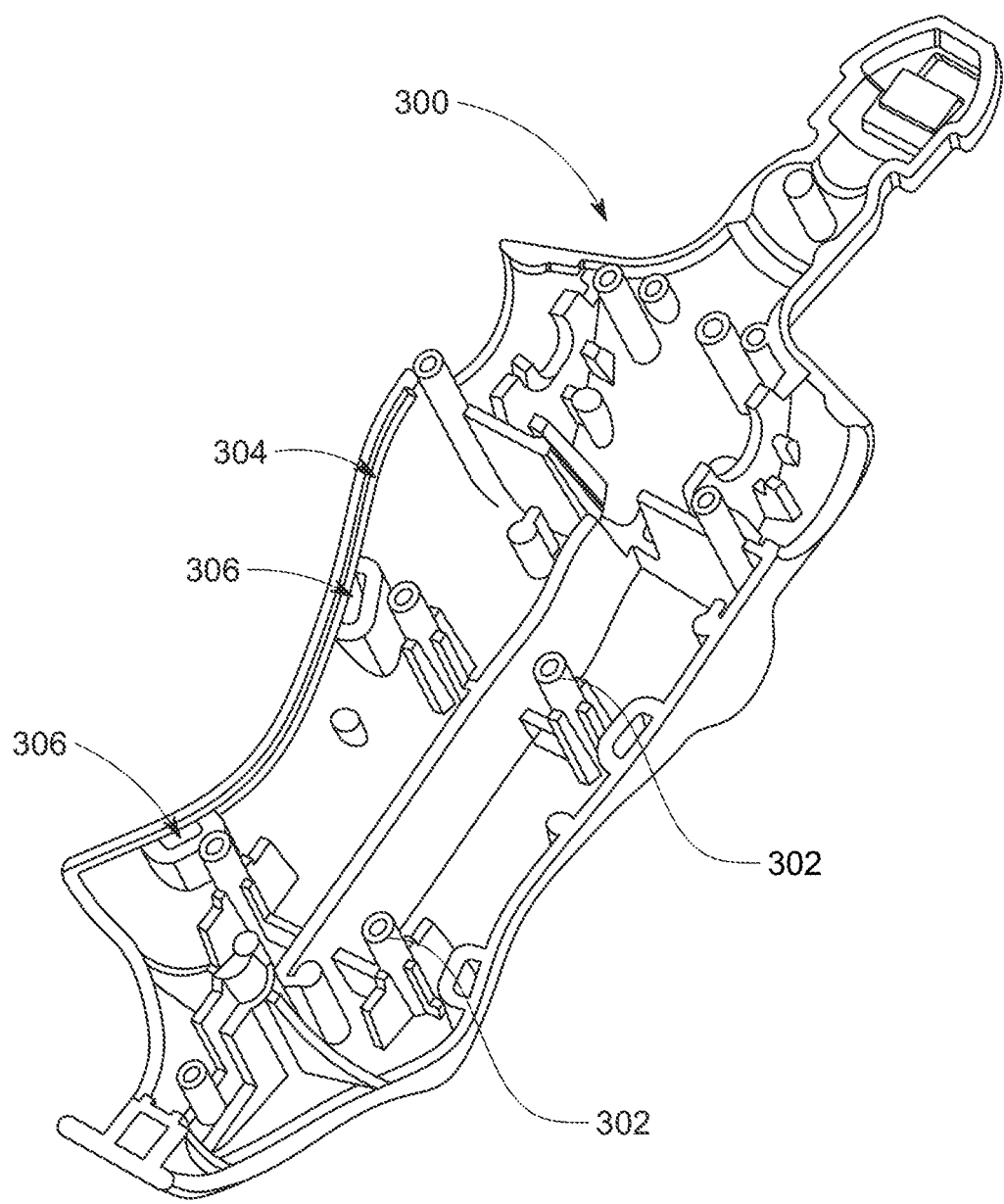
FIGS. 3A-3B illustrate various perspective views of the front body section, in accordance with an embodiment of the invention.
Figure 3B:
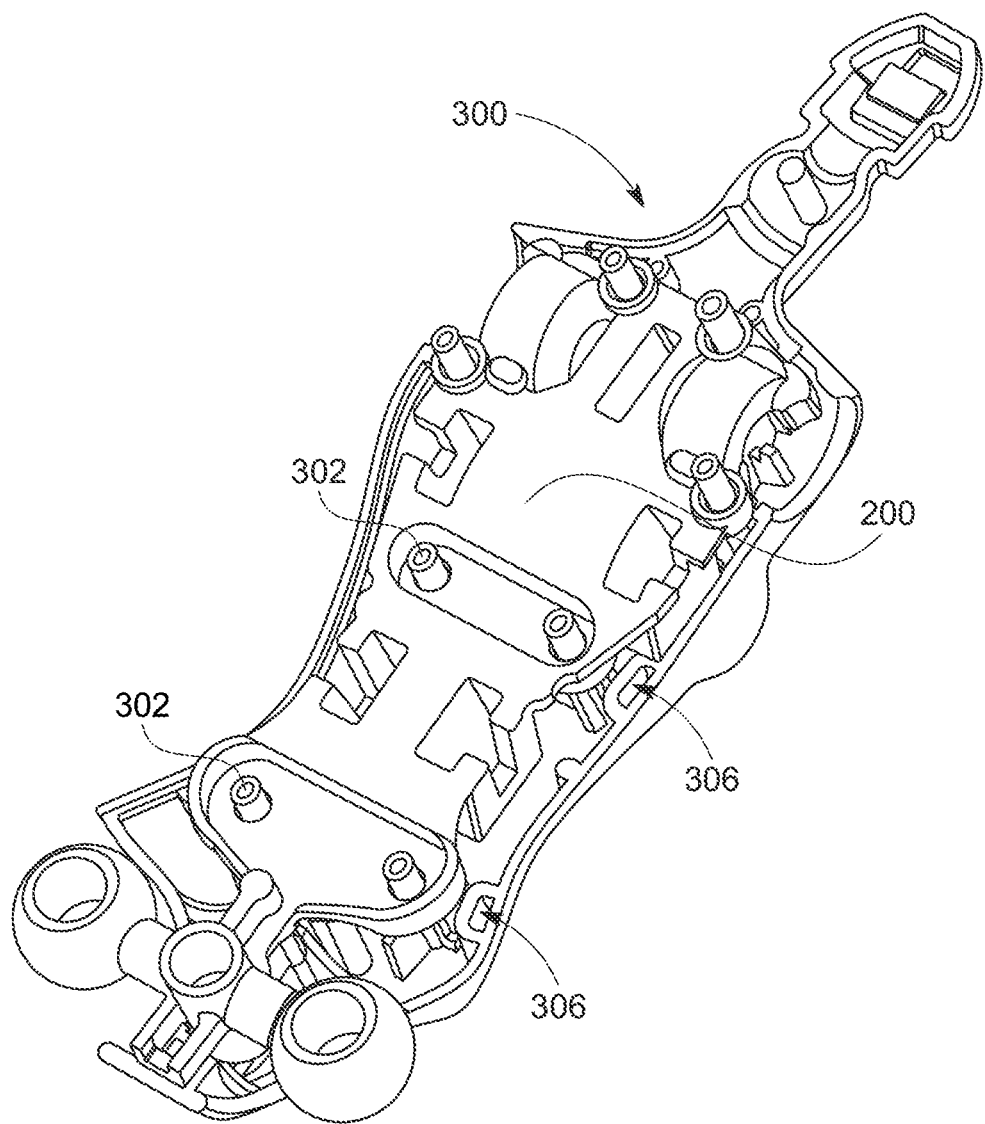

Referring now to FIGS. 3A and 3B, the inner surface of front body section 300 includes multiple molded bosses or studs 302. Studs 302 are positioned to align with respective holes 202 of inner plate 200 (see FIG. 3B). Studs 302 have an initial length that allows them to protrude through inner plate 200 when inserted into holes 202 of inner plate 200. Studs 302 are used for thermoplastic staking or heat staking front body section 300 to the front side of inner plate 200. Staking eliminates the need for screws and other consumables that may be used in other joining methods. Furthermore, staking provides a strong and firm connection between front body section 300 and inner plate 200 that allows arms 104 and legs 106 to be stably retained and supported by inner plate 200. Additionally, staking allows the front body section to be permanently coupled to the inner plate even in embodiments where the front body section and the inner plate are different plastics or materials (e.g., metal, PCB). To further facilitate the alignment between front body section 300 and back body section 400, the perimeter of the inner surface of front body section 300 includes an indentation 304 and multiple slots 306.

Figure 4A:
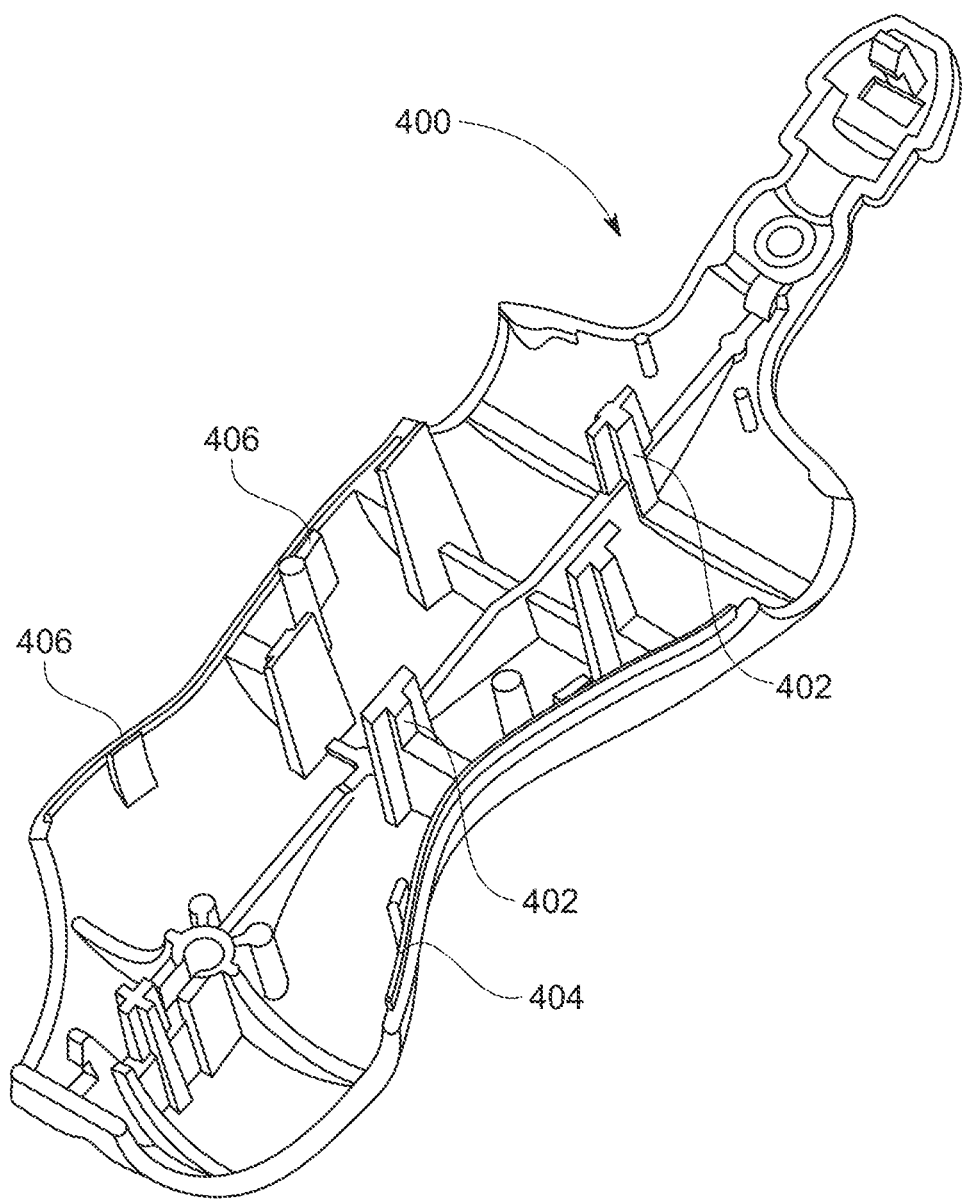
FIGS. 4A-4B illustrate various perspective views of the back body section, in accordance with an embodiment of the invention.
Figure 4B:
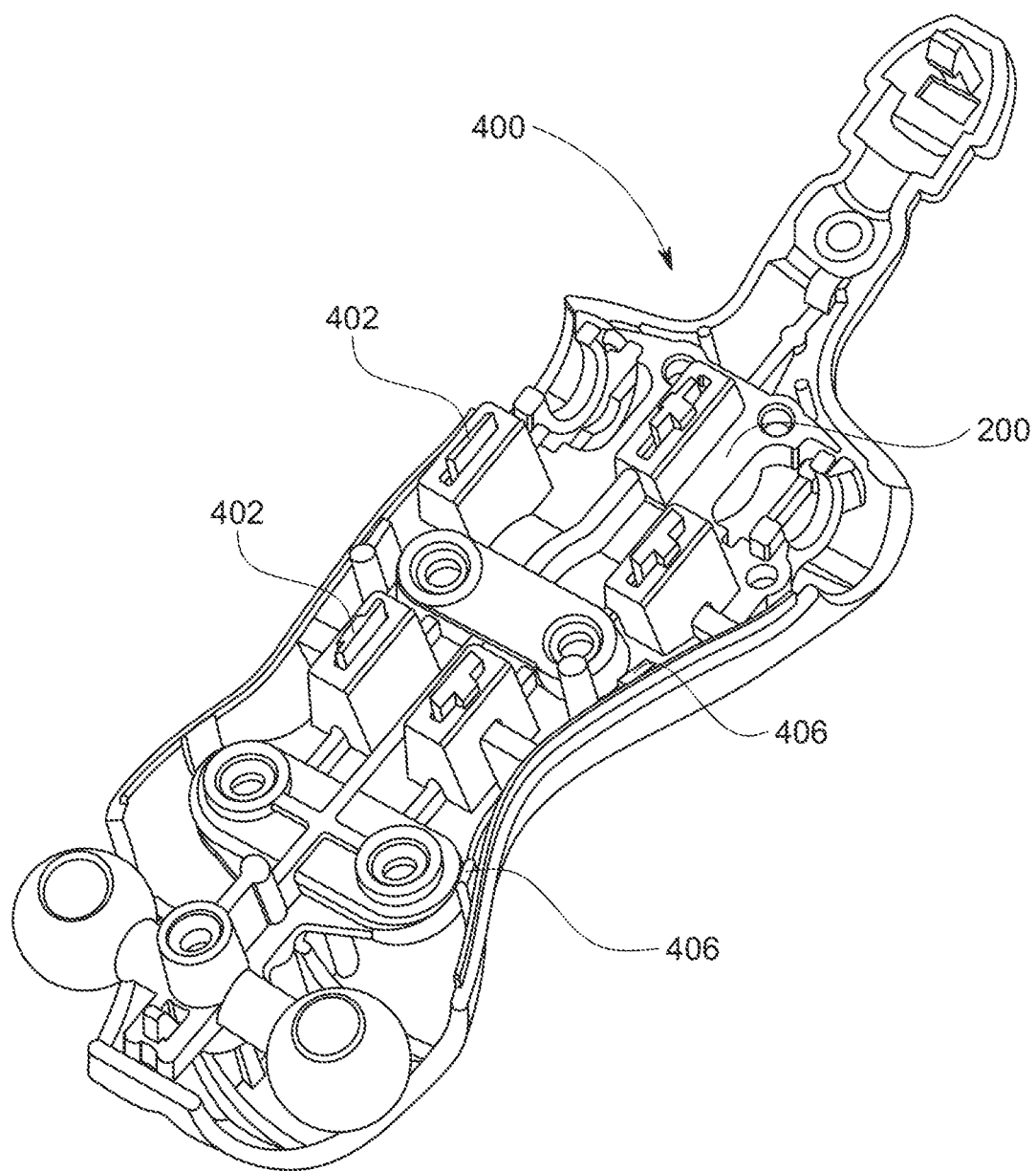

Referring now to FIGS. 4A and 4B, the inner surface of back body section 400 includes multiple snap-fit connectors 402. Snap-fit connectors 402 are positioned to interlock with respective openings 204 of inner plate 200 to couple back body section 400 to the back side of inner plate 200 (see FIG. 4B). Snap-fit connectors 402 allow for the coupling of back body section 400 to inner plate 200 without requiring access to the front side of inner plate 200. This is necessary because an earlier step in the fabrication process results in front body section 300 being coupled to and covering the front side of inner plate 200. Furthermore, even though the use of snap-fit connectors 402 may involve some overtravel with inner plate 200 that results in a looser fit and weaker connection compared to the use of studs and staking, snap-fit connectors 402 are not relied upon to retain and support arms 104 and legs 106 and thus provide sufficient strength to hold back body section 400 in place. Similar to studs, snap-fit connectors also allow the back body section to be coupled to the inner plate even in embodiments where the back body section and the inner plate are different plastics or materials (e.g., metal, PCB).

Figure 5A:
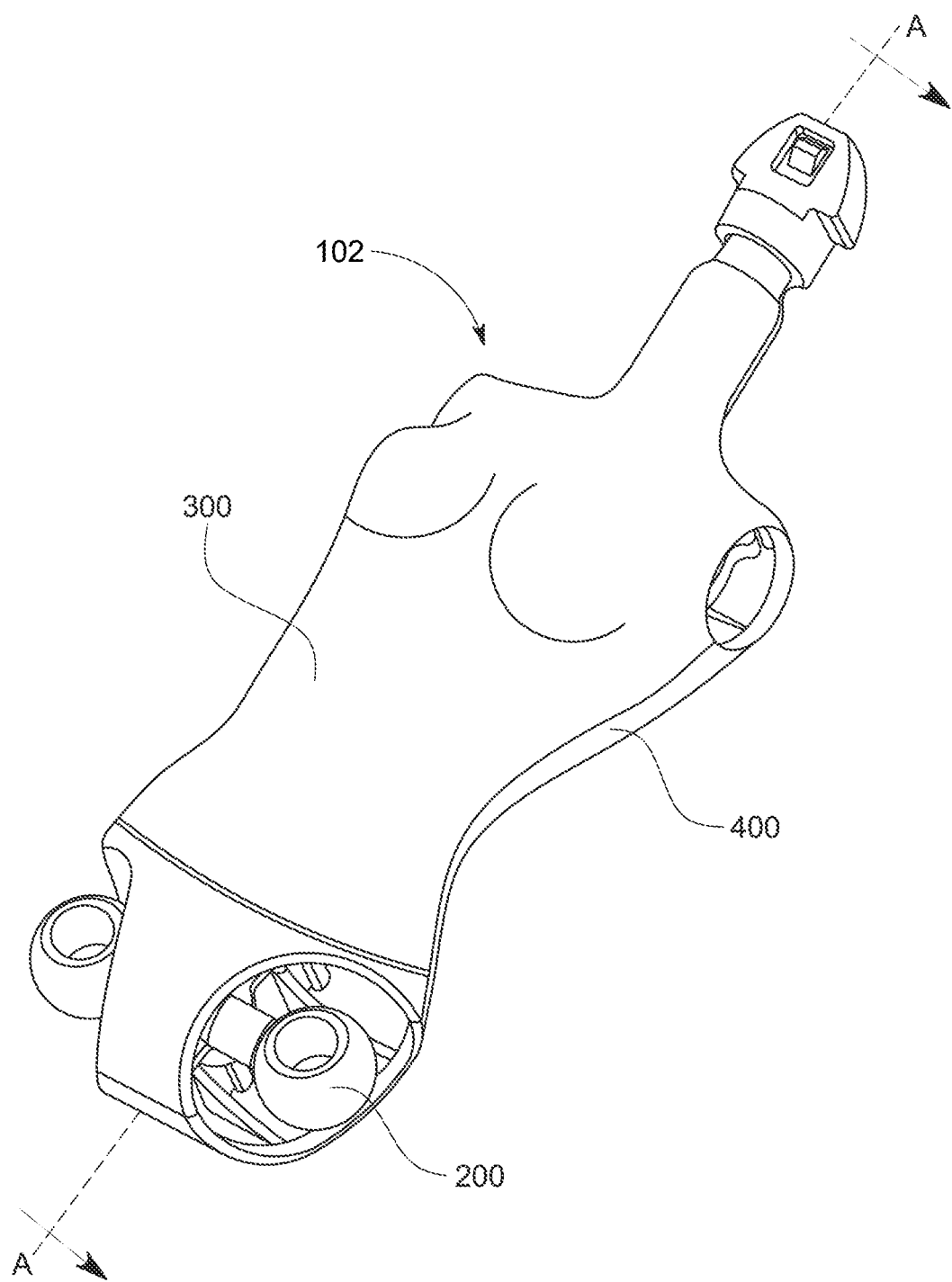
FIGS. 5A-5B illustrate various views of the torso of the toy figurine, in accordance with an embodiment of the invention.

The perimeter of the inner surface of back body section 400 includes a protrusion 404 that abuts indentation 304 of front body section 300 when front body section 300 and back body section 400 are assembled together to form torso 102 (see, e.g., FIG. 5A). Protrusion 404 and indentation 304 ensure front body section 300 and back body section 400 are correctly aligned when brought together. Additionally, the inner surface of back body section 400 includes multiple extensions 406 that are spaced along the perimeter of back body section 400. Extensions 406 can be positioned to extend into respective slots 306 of front body section 300 to further facilitate alignment between front body section 300 and back body section 400. However, other embodiments might have only extensions 406 and slots 306, only protrusion 404 and indentation 304, or any other feature that might facilitate alignment between front body section 300 and back body section 400.

Figure 5B:
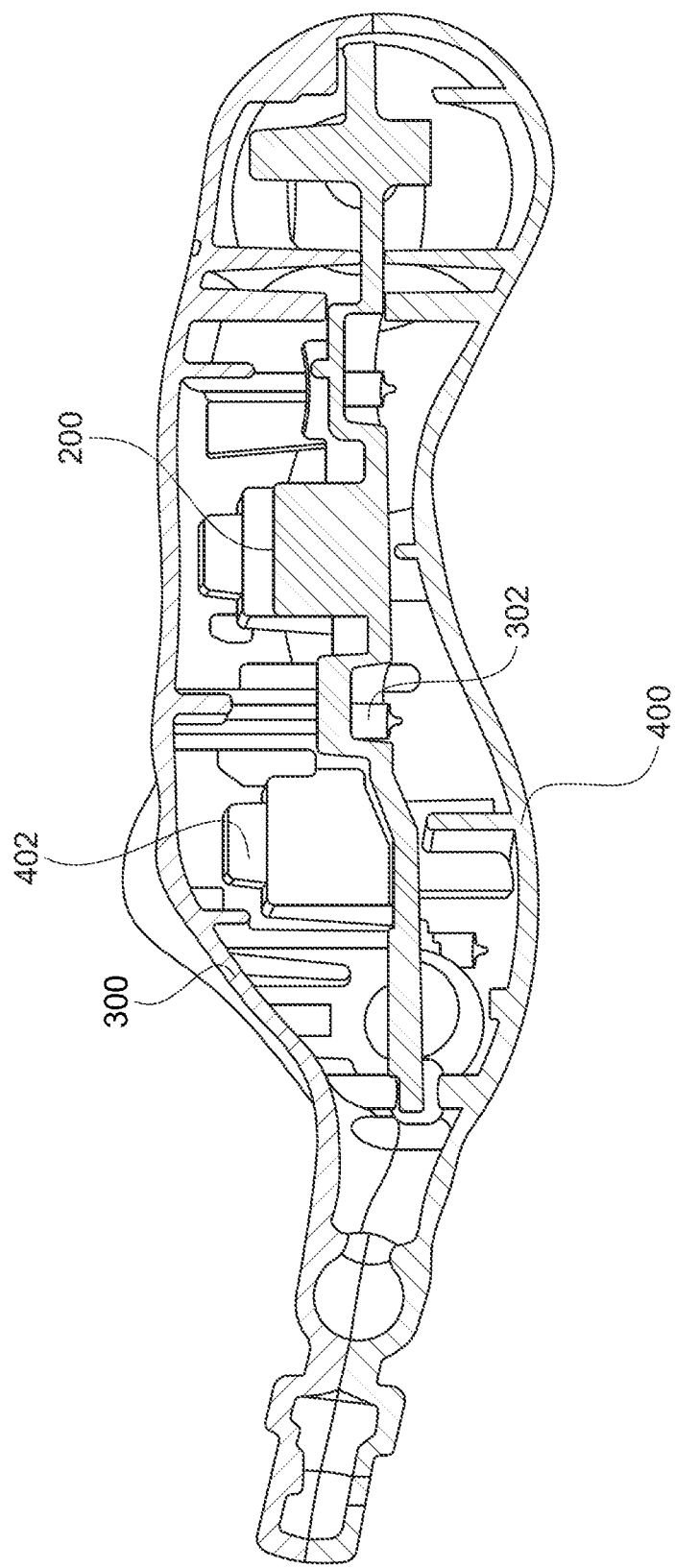

FIGS. 5A and 5B show inner plate 200, front body section 300, and back body section 400 assembled together to form torso 102. Inner plate 200 is enclosed between front body section 300 and back body section 400 and holds front body section 300 and back body section 400 together. In preferred embodiments, front body section 300 is not directly coupled to back body section 400. Instead, the front body 300 is indirectly coupled to the back section 400. For example, in the exemplary embodiment shown in FIGS. 1-5, protrusion 404 and extensions 406 are not coupled to respective indentation 304 and slots 306. Instead, protrusion 404 and extensions 406 only abut respective indentation 304 and slots 306 to facilitate the alignment between front body section 300 and back body section 400. Then, the front body 300 is indirectly coupled to the back section 400 via inner plate 200. In certain embodiments, the front body section and the back body section do not include a protrusion, an indentation, extensions, and/or slots. Front body section 300 and back body section 400 are further contoured to provide openings that allow arms 104 and legs 106 to be movably connected to torso 102 via respective recesses 206 and ball joints 208 (see also FIG. 1C).

In a preferred embodiment, the whole toy figurine (including the body assembly, head, and appendages) is made of a single recyclable and/or sustainable material such as post-consumer recycled high-density polyethylene (HDPE) or a bio/plant-based plastic. Because the toy figurine does not include extraneous materials such as metal screws or adhesives that can affect the recycling process, the toy figurine can be easily recycled to reduce waste and resource consumption. That is, due to its composition and fabrication, the entire figurine may be recyclable.

Figure 6:
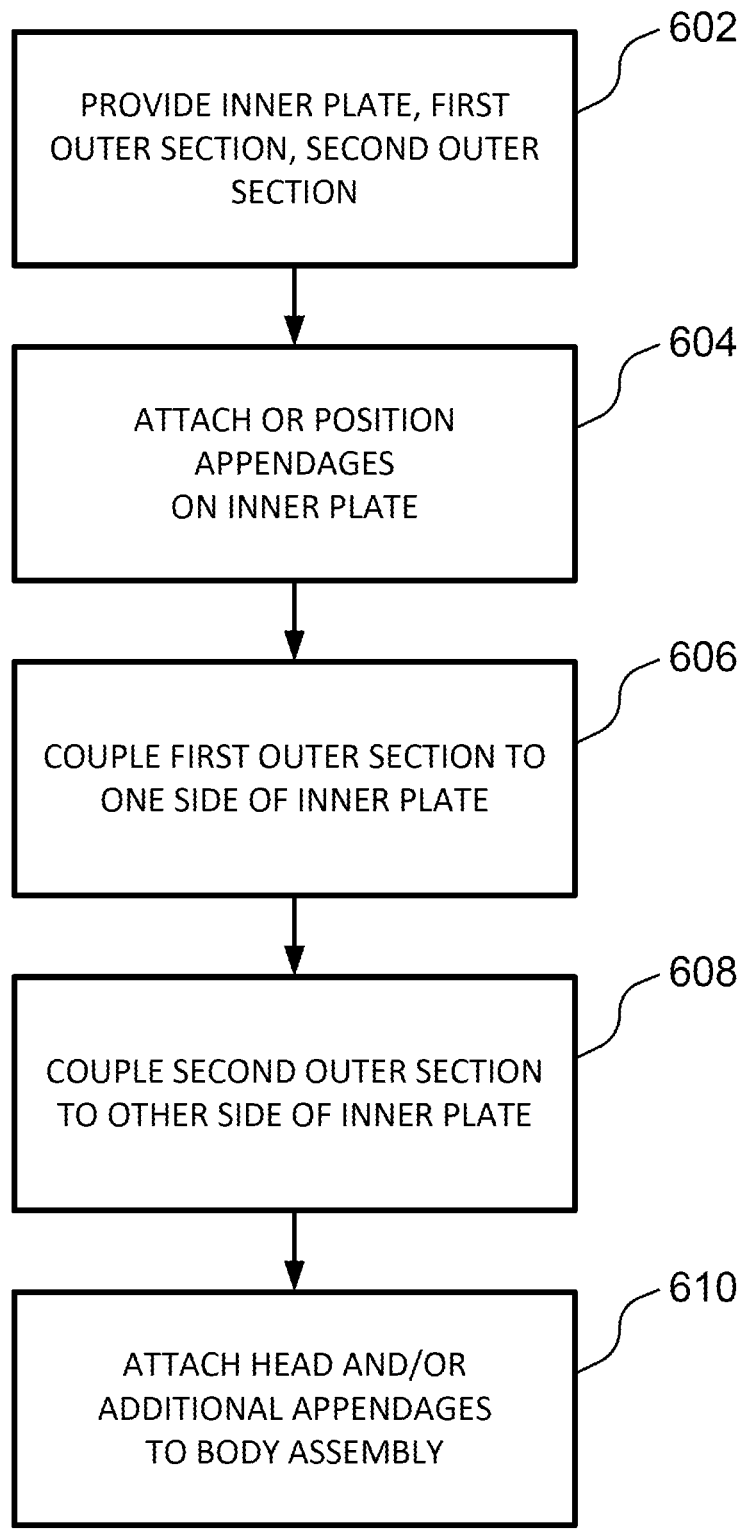
FIG. 6 illustrates an exemplary method of fabricating a toy figurine, in accordance with an embodiment of the invention.

FIG. 6 illustrates an exemplary method 600 for fabricating the body assembly of a toy figurine. The method begins at step 602, where an inner plate, first outer section, and second outer section are provided.

In step 604, appendages such as arms and legs are attached to or positioned on the inner plate. In one exemplary implementation, a pair of legs is coupled to respective ball joints on the inner plate and a pair of arms is positioned in respective recesses on the inner plate.

In step 606, the first outer section is then coupled to one side of the inner plate. In one exemplary implementation, the coupling members of the first outer section are molded studs that are aligned and inserted into respective holes in the inner plate. Thermoplastic staking is then used to couple the first outer section to the inner plate. The pair of arms positioned in the recesses of the inner plate is also thereby movably retained between the first outer section and inner plate. However, step 606 need not be performed after step 604 and these steps could be performed in unison or with either step 604 or steep 606 being completed first.

In step 608, the second outer section is coupled to the opposite side of the inner plate. In one exemplary implementation, the coupling members of the second outer section are snap-fit connectors. The second outer section is pressed against the combined inner plate and first outer section assembly, which causes the snap-fit connectors to interlock with the holes in the inner plate. This may lock appendages installed at step 604 (before or after step 606) in place.

In step 610, a head and/or additional appendages are then coupled to the body assembly to create the toy figurine.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. For example, the method for fabricating the body assembly can be also applied to other body parts and appendages of a toy figurine, as well as other polyolefin-based toy assemblies. For instance, a leg may be similarly fabricated without the use of screws or adhesives by individually coupling a front leg section and a back leg section to an inner plate. Additionally, in some embodiments, other types or combinations of coupling members may be used to couple the front body section and/or back body section to the inner plate and eliminate the need to solvent bond/glue or screw the two body sections to each other. For instance, in one embodiment, both the first coupling members and second coupling members are snap fit connectors that interlock with respective openings of uniform size and shape on the inner plate.

Moreover, it is to be understood that terms such as "front," "back," "side," "length," "exterior," "inner," "outer" and the like as may be used herein, merely describe points or portions of reference and do not limit the present invention to any particular orientation or configuration. Further, the term "exemplary" may be used herein to describe an example or illustration. Any embodiment described herein as exemplary is not to be construed as a preferred or advantageous embodiment, but rather as one example or illustration of a possible embodiment of the invention. Finally, various features from one of the embodiments may be incorporated into another of the embodiments.

The invention claimed is:

1. A body assembly for a toy figurine comprising:
   an inner plate having a plurality of openings;
   a first outer section coupled to a first side of the inner plate, the first outer section including one or more first coupling members positioned on one side of the first outer section that are engaged with one or more of the plurality of openings on the inner plate; and a second outer section coupled to a second side of the inner plate, the second outer section including one or more second coupling members positioned on one side of the second outer section that are engaged with one or more of the plurality of openings on the inner plate, wherein the inner plate is enclosed between the first outer section and the second outer section, and the inner plate holds the first outer section and the second outer section together.

2. The body assembly of claim 1, wherein the first outer section is not directly coupled to the second outer section.

3. The body assembly of claim 1, wherein the one or more first coupling members are different from the one or more second coupling members.

4. The body assembly of claim 1, wherein the one or more first coupling members are studs and the first outer section is thermoplastic staked or heat staked to the inner plate.

5. The body assembly of claim 4, wherein the one or more second coupling members are snap-fit connectors interlocked with the inner plate.

6. The body assembly of claim 1 further comprising a pair of arms and the inner plate includes a pair of recessed areas, wherein each arm is movably retained between one of the pair of recessed areas and the first outer section.

7. The body assembly of claim 1 further comprising a pair of legs and the inner plate includes a pair of annular ball joints, wherein each leg is movably coupled to one of the pair of annular ball joints.

8. The body assembly of claim 1, wherein the body assembly is completely made of a high-density polyethylene (HDPE) and does not include an adhesive or screw.

9. A toy assembly comprising:
an inner plate;
a front section coupled to the inner plate, the front section including one or more first coupling members that are engaged with the inner plate; and
a back section coupled to the inner plate, the back section including one or more second coupling members that are engaged with the inner plate,
wherein the front section and the back section form an outer shell that encloses the inner plate, and the inner plate holds the front section and the back section together.

10. The toy assembly of claim 9, wherein the front section is not directly coupled to the back section.

11. The toy assembly of claim 9 wherein the one or more first coupling members are different from the one or more second coupling members.

12. The toy assembly of claim 9 wherein the one or more first coupling members are studs and the front section is thermoplastic staked or heat staked to the inner plate.

13. The toy assembly of claim 12, wherein the one or more second coupling members are snap-fit connectors interlocked with the inner plate.

14. The toy assembly of claim 9, wherein the inner plate, the front section, and the back section are made of a high-density polyethylene (HDPE).

15. The toy assembly of claim 9, wherein the inner plate includes one or more sockets and/or ball joints for engaging with one or more external members.

16. A method of fabricating a body assembly for a toy figurine, the method comprising the steps of:
providing an inner plate having a plurality of holes and openings, a first outer section with molded studs, and a second outer section with snap-fit connectors;
positioning the first outer section to be proximate a first side of the inner plate and inserting the molded studs through the holes of the inner plate;
thermoplastic staking or heat staking the first outer section to the inner plate;
positioning the second outer section to be proximate a second side of the inner plate and aligning the snap-fit connectors with the openings of the inner plate; and
pressing the second outer section against the inner plate such that the snap-fit connectors interlock with the openings of the inner plate,
wherein the inner plate is enclosed between the first outer section and the second outer section, and the inner plate holds the first outer section and the second outer section together.

17. The method of claim 16, further comprising the step of retaining a portion of a pair of arms between the first outer section and the inner plate before thermoplastic staking or heat staking the first outer section to the inner plate.

18. The method of claim 16, further comprising the step of coupling a pair of legs to the inner plate before pressing the second outer section against the inner plate.

19. The method of claim 16, wherein the inner plate, the first outer section, and the second outer section are made of a high-density polyethylene (HDPE).

* * * * *